United States Patent
Takagishi et al.

(10) Patent No.: US 8,120,875 B2
(45) Date of Patent: Feb. 21, 2012

(54) MAGNETIC RECORDING APPARATUS UTILIZING A SPIN TORQUE OSCILLATOR WHICH INTERACTS WITH AN ANTENNA LAYER IN THE MAGNETIC RECORDING MEDIUM

(75) Inventors: Masayuki Takagishi, Kunitachi (JP); Kenichiro Yamada, Tokyo (JP); Hitoshi Iwasaki, Yokosuka (JP); Tomomi Funayama, Fuchu (JP); Masahiro Takashita, Yokohama (JP); Mariko Shimizu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 288 days.

(21) Appl. No.: 12/512,237

(22) Filed: Jul. 30, 2009

(65) Prior Publication Data

US 2010/0027161 A1 Feb. 4, 2010

(30) Foreign Application Priority Data

Jul. 31, 2008 (JP) .................................. 2008-198144

(51) Int. Cl.
G11B 5/127 (2006.01)
(52) U.S. Cl. ............................... 360/125.31; 360/125.74
(58) Field of Classification Search ............. 360/125.31, 360/125.74
See application file for complete search history.

(56) References Cited

U.S. PATENT DOCUMENTS

| 6,011,664 A | 1/2000 | Kryder et al. ................... 360/59 |
| 7,471,491 B2 | 12/2008 | Sato et al. ...................... 360/313 |
| 2005/0023938 A1 | 2/2005 | Sato et al. ...................... 310/363 |
| 2008/0304176 A1* | 12/2008 | Takagishi et al. ............... 360/86 |
| 2009/0074478 A1 | 3/2009 | Kurachi et al. ............... 399/308 |

FOREIGN PATENT DOCUMENTS

| JP | 2003317220 A | 11/2003 |
| JP | 2005-108302 A | 4/2005 |
| JP | 2005-285242 A | 10/2005 |
| JP | 2007-299460 A | 11/2007 |
| JP | 2009-080904 A | 4/2009 |

OTHER PUBLICATIONS

U.S. Appl. No. 12/421,558, Oikawa, Apr. 9, 2009.
Japanese Office Action dated Nov. 22, 2011 from JP 2008-198144.

* cited by examiner

*Primary Examiner* — Allen Heinz
(74) *Attorney, Agent, or Firm* — Ohlandt, Greeley, Ruggiero & Perle, L.L.P.

(57) ABSTRACT

A magnetic recording apparatus includes a magnetic recording head having a magnetic pole and a spin torque oscillator, the spin torque oscillator being placed adjacent to the magnetic pole and includes at least two magnetic layers of a first magnetic layer and a second magnetic layer, and a magnetic recording medium includes two magnetic layers of a recording layer and an antenna layer, the recording layer including a hard magnetic material, such that the antenna layer is formed closer to the magnetic recording head than the recording layer, in which the antenna layer has a resonance frequency fa lower than a resonance frequency fr of the recording layer, greater than a resonance frequency of the second magnetic layer, and the recording layer and the antenna layer are ferromagnetically coupled to each other.

5 Claims, 7 Drawing Sheets

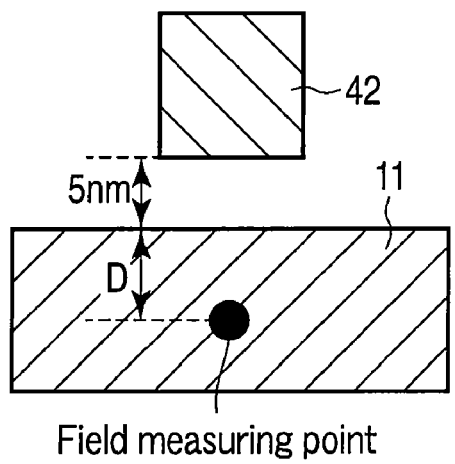
F I G. 3A
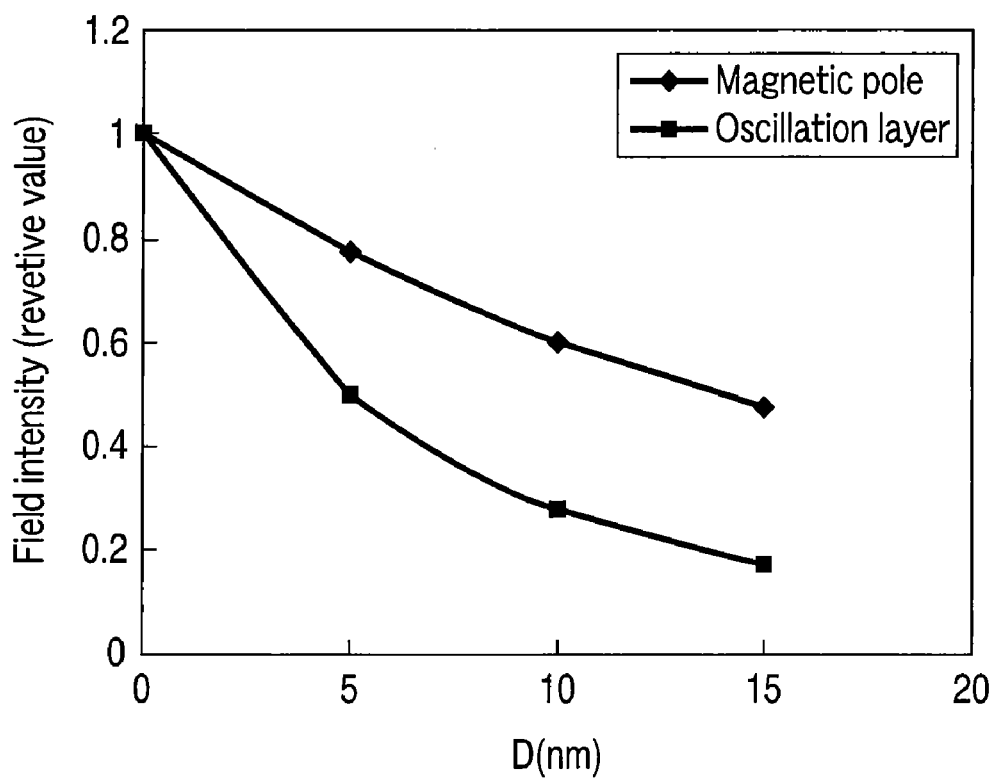
F I G. 3B

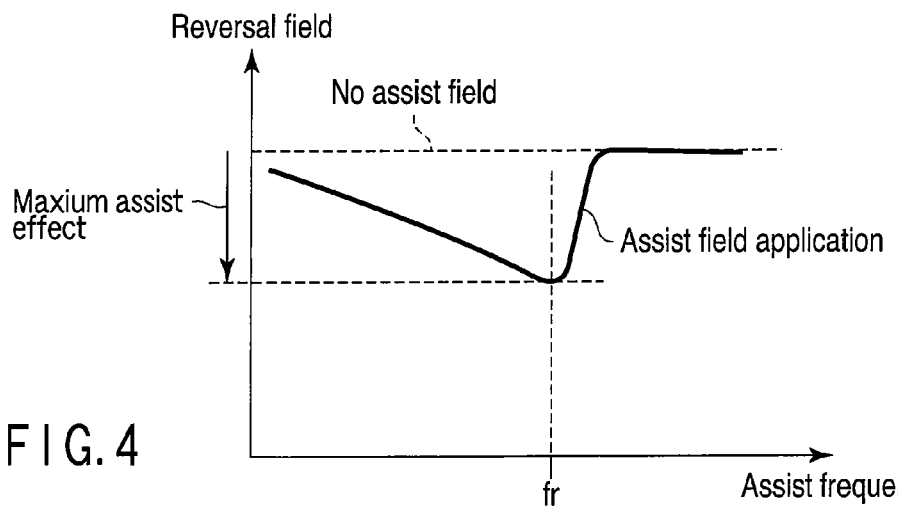
F I G. 4
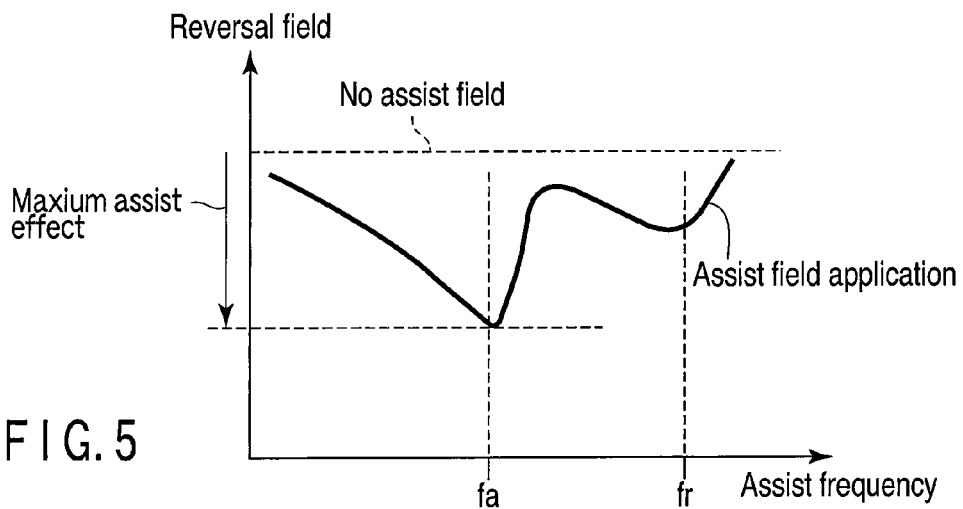
F I G. 5
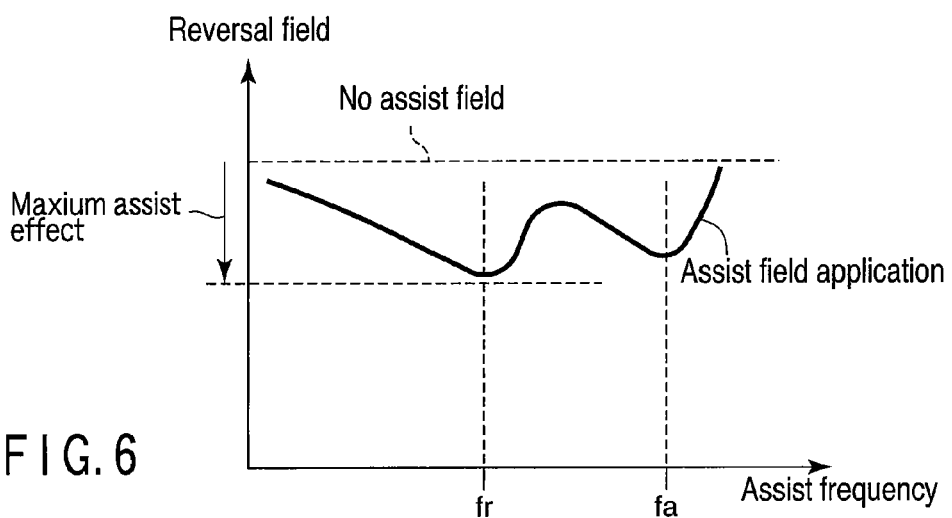
F I G. 6

MAGNETIC RECORDING APPARATUS UTILIZING A SPIN TORQUE OSCILLATOR WHICH INTERACTS WITH AN ANTENNA LAYER IN THE MAGNETIC RECORDING MEDIUM

CROSS-REFERENCE TO RELATED APPLICATIONS

This application is based upon and claims the benefit of priority from prior Japanese Patent Application No. 2008-198144, filed Jul. 31, 2008, the entire contents of which are incorporated herein by reference.

BACKGROUND OF THE INVENTION

1. Field of the Invention

The present invention relates to a microwave assisted magnetic recording apparatus suitable to provide data storage with high recording density, high recording capacity and a high data transfer rate.

2. Description of the Related Art

As a recording system that may solve the problem of thermal fluctuation in a magnetic recording medium, there is proposed a so-called "microwave assisted magnetic recording system". In the microwave assisted magnetic recording system, a high-frequency magnetic field near the resonance frequency of a magnetic recording medium, which is sufficiently higher than a recording signal frequency, is locally applied to the magnetic recording medium. As a result, the magnetic recording medium resonates, and the coercivity (Hc) of the magnetic recording medium to which the high-frequency magnetic field is applied becomes half or less of its original value. Therefore, magnetic recording on a magnetic recording medium having a higher coercivity (Hc) and high anisotropy energy (Ku) is made possible by superimposing a high-frequency magnetic field on a recording magnetic field (e.g., U.S. Pat. No. 6,011,664).

In a method disclosed in the patent, however, a high-frequency magnetic field is produced with a coil. It has therefore been difficult to efficiently apply a high-frequency magnetic field during recording with high density.

To address this difficulty, there is also proposed a method of utilizing a spin torque oscillator as a device to produce a high-frequency magnetic field (e.g., U.S. Patent Application Publication Nos. 2005/0023938 and 2005/0219771). The spin torque oscillator as disclosed in these publications includes a spin injection layer, a non-magnetic layer, and a magnetic layer (hereinafter referred to as an "oscillation layer"). When a direct current (DC) is passed through the spin torque oscillator by means of an electrode, a spin torque produced by a spin injection layer causes ferromagnetic resonance in the magnetization of the oscillation layer. As a result, a high-frequency magnetic field is produced from the spin torque oscillator. Since the size of the spin torque oscillator is about several tens of nanometers, the produced high-frequency magnetic field is localized within about several tens of nanometers of the spin torque oscillator. Furthermore, the in-plane component of the high-frequency magnetic field allows a perpendicularly magnetized magnetic recording medium to efficiently resonate to significantly decrease the coercivity of the magnetic recording medium. As a result, high-density magnetic recording is performed only in a portion where a high-frequency magnetic field by the spin torque oscillator is superimposed on a recording magnetic field by the magnetic pole. This enables to make a magnetic recording medium having a high coercivity (Hc) and high anisotropy energy (Ku). Thus, it is possible to avoid the problem of thermal fluctuation during high-density recording.

However, even with the use of the spin torque oscillator, the intensity of the high-frequency magnetic field significantly decreases if the distance from the surface of the medium to the oscillation layer is increased. Therefore, there is a problem that achievement of microwave assisted magnetic recording is difficult.

BRIEF SUMMARY OF THE INVENTION

According to an aspect of the present invention, there is provided a magnetic recording apparatus comprising: a magnetic recording head having a magnetic pole and a spin torque oscillator, the spin torque oscillator being placed adjacent to the magnetic pole and comprising at least two magnetic layers of a first magnetic layer and a second magnetic layer; and a magnetic recording medium comprising two magnetic layers of a recording layer and an antenna layer, the recording layer including a hard magnetic material, such that the antenna layer is formed closer to the magnetic recording head than the recording layer, wherein the antenna layer has a resonance frequency fa lower than a resonance frequency fr of the recording layer, greater than a resonance frequency of the second magnetic layer, and the recording layer and the antenna layer are ferromagnetically coupled to each other.

According to another aspect of the present invention, there is provided a magnetic recording apparatus comprising: a magnetic recording head having a magnetic pole and a spin torque oscillator, the spin torque oscillator being placed adjacent to the magnetic pole and comprising at least two magnetic layers of a first magnetic layer and a second magnetic layer, the first magnetic layer having a coercivity smaller than a magnetic field produced from the magnetic pole and located at the first magnetic layer, the second magnetic layer having a coercivity smaller than the coercivity of the first magnetic layer; and a magnetic recording medium comprising two magnetic layers of a recording layer and an antenna layer, at least the recording layer being hard magnetic, such that the antenna layer is formed closer to the magnetic recording head than the recording layer, the antenna layer has a resonance frequency fa lower than a resonance frequency fr of the recording layer, and the recording layer and the antenna layer are ferromagnetically coupled to each other.

BRIEF DESCRIPTION OF THE SEVERAL VIEWS OF THE DRAWING

FIG. 3A is a cross-sectional view of a recording layer and an oscillation layer disposed thereabove, and FIG. 3B shows the magnetic field intensities of the magnetic pole and the oscillation layer as functions of a distance D from the top surface to the center of the recording layer;

FIG. 4 shows the relationship between the reversal field and the frequency of the assist field in a usual magnetic recording medium without an antenna layer;

FIG. 5 shows the relationship between the reversal field and the frequency of the assist field in a magnetic recording medium in which a resonance frequency fa of the antenna layer is lower than a resonance frequency fr of the recording layer;

FIG. 6 shows the relationship between the reversal field and the frequency of the assist field in a magnetic recording medium in which the resonance frequency fa of the antenna layer is higher than the resonance frequency fr of the recording layer;

DETAILED DESCRIPTION OF THE INVENTION

Embodiments of the present invention will be described below.

First Embodiment

Figure 1:
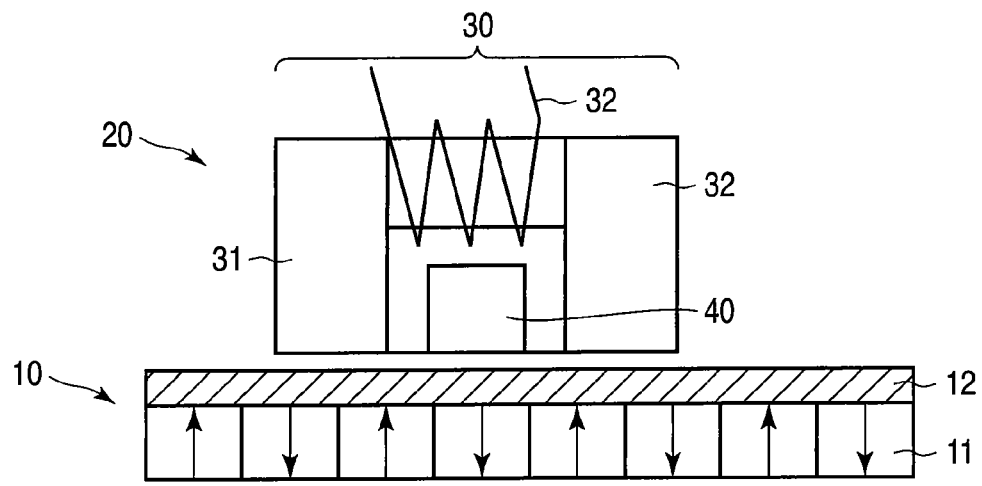
FIG. 1 is a cross-sectional view of a magnetic recording apparatus according to an embodiment.

FIG. 1 is a cross-sectional view of a magnetic recording apparatus according to this embodiment. A magnetic recording medium 10 includes a hard magnetic recording layer 11 and a hard magnetic antenna layer 12 formed on a substrate (not shown). As will be described in detail later, a resonance frequency fa of the antenna layer 12 is lower than a resonance frequency fr of the recording layer 11. The recording layer 11 and the antenna layer 12 are ferromagnetically coupled. The recording layer 11 and the antenna layer 12 may be in direct contact with each other, and also may have a non-magnetic layer or a magnetic metal interposed therebetween. A magnetic recording head 20 disposed above the magnetic recording medium 10 has a write pole 30 and a spin torque oscillator (STO) 40. The write pole 30 includes a magnetic pole 31, a shield 32 and a coil 33 for exciting these components.

Figure 2:
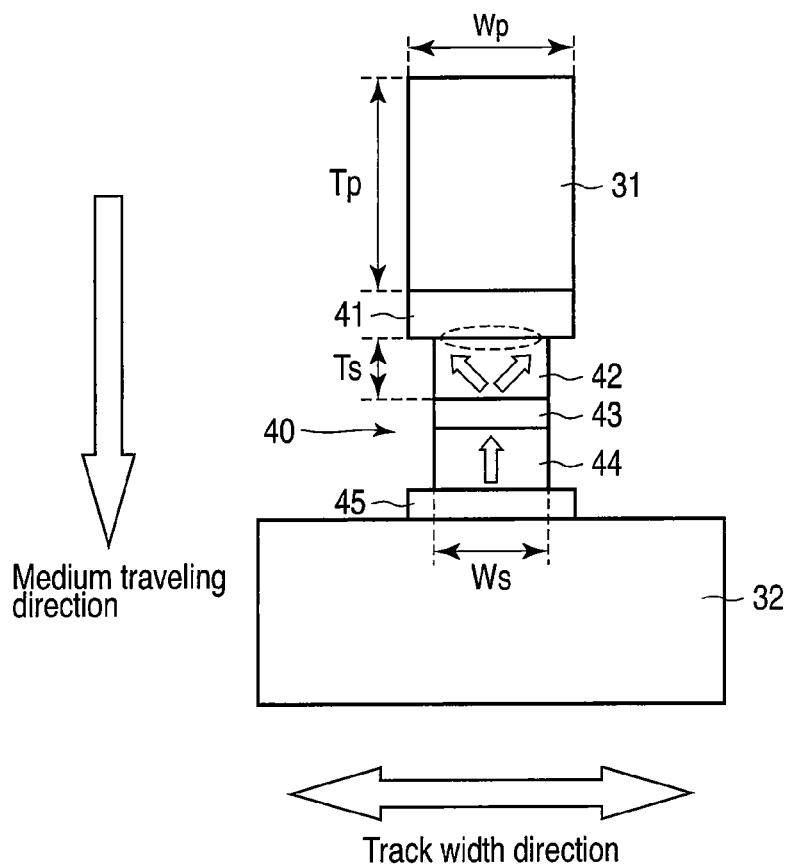
FIG. 2 is a plan view of a magnetic recording head as viewed from the air-bearing surface according to the embodiment.

FIG. 2 is a plan view of the magnetic recording head 20 according to the embodiment as viewed from the air-bearing surface. The spin torque oscillator 40 has a structure in which a first electrode layer 41, a second magnetic layer (referred to as an "oscillation layer" hereinafter) 42, an intermediate layer 43, a first magnetic layer (referred to as a "spin injection layer" hereinafter) 44 and a second electrode layer 45 are stacked between the magnetic pole 31 and the shield 32.

In the magnetic recording medium 10 of FIG. 1, the magnetization of the antenna layer 12 is generally oriented in the same direction as the magnetization of the recording layer 11. When a current is passed through the spin torque oscillator 40 of FIG. 2 in a direction from the shield 32 toward the magnetic pole 31, the magnetization of the oscillation layer 42 oscillates to produce a high-frequency magnetic field. The antenna layer 12 is located closer to the oscillation layer 42 than the recording layer 11, and the magnetization of the antenna layer 12 is influenced by the high-frequency magnetic field to reverse earlier than the magnetization of the recording layer 11. When the magnetization of the antenna layer 12 is reversed, the magnetization of the recording layer 11 disposed thereunder is also reversed.

To cause the oscillation layer 42 to oscillate as uniformly as possible and to raise oscillation efficiency, a thickness Ts of the oscillation layer 42 should be as thin as possible, and a width Ws of the oscillation layer 42 should be as small as possible. However, if these sizes are too small, the intensity of the high-frequency magnetic field cannot be ensured. Thus, it is preferable that the thickness Ts of the oscillation layer 42 be 5 to 20 nm. It is preferable that the width Ws of the oscillation layer 42 be approximately equal to or slightly smaller than a width Wp of the magnetic pole 31. For example, to obtain a recording density of about 2 Tbpsi, the width Wp of the magnetic pole 31 is set to about 30 nm. A thickness Tp of the magnetic pole 31 is set to about 100 nm in consideration of skew. In this case, the size of the oscillation layer 42 on the air-bearing surface is set to, for example, about 10 nm×25 nm. If these sizes are small, the flying height dependence of the magnetic field intensity of the recording head 20 (the magnetic pole and the oscillation layer) becomes large. The term "flying height" as used herein is defined as the distance from the air-bearing surface of the recording head 20 to the center of the recording layer 11. This definition involves consideration of the fact that the magnetic field intensity at the center of the recording layer 11 contributes to effective recording characteristics. Thus, the flying height corresponds to the easiness of writing.

FIG. 3A is a cross-sectional view of the recording layer 11 and the oscillation layer 42 of the spin torque oscillator disposed thereabove. In this figure, it is assumed that the antenna layer 12 is not provided above the recording layer 11. In this figure, the distance from the air-bearing surface of the oscillation layer 42 to the top surface of the recording layer 11 is set to 5 nm. From the foregoing definition, it is found that as the thickness of the recording layer 11 decreases, the flying height decreases to facilitate writing.

However, to protect recorded data from thermal deterioration, the thickness of the recording layer 11 cannot be reduced without any limitation. The criteria to determine thermal deterioration of a recording medium is expressed by KuV/kT; the larger the value of KuV/kT, the less the thermal deterioration. Here, Ku is the anisotropy constant of a recording layer, V is the grain volume of the recording layer, T is absolute temperature, and k is the Boltzmann constant. Now, when the thickness of the recording layer 11 is reduced, the grain volume V is reduced to decrease KuV/kT, which facilitates thermal deterioration.

As described above, assuming that the distance from the air-bearing surface of the oscillation layer 42 to the top surface of the recording layer 11 is set to 5 nm, and the thickness of the recording layer 11 is 15 nm, the distance D from the top surface to the center of the recording layer 11 is 7.5 nm. Accordingly, the effective flying height is 12.5 nm.

FIG. 3B shows the magnetic field intensities (measured at the center of the recording layer 11) of the magnetic pole 31 of 30 nm×100 nm and the oscillation layer 42 of 10 nm×25 nm as functions of the distance D from the top surface to the center of the recording layer 11. When the distance D is 7.5 nm, the attenuation of the magnetic field intensity of the magnetic pole 31 is 30% whereas the attenuation of the magnetic field intensity of the oscillation layer 42 is as high as 65%. Such a large attenuation of the assist field of the oscillation layer 42 is a problem in achieving microwave assisted magnetic recording.

In the present invention, the problem due to the attenuation of the magnetic field intensity of the oscillation layer 42 is solved by providing the antenna layer 12 on the recording layer 11 and setting the resonance frequency fa of the antenna layer 12 to be smaller than the resonance frequency fr of the recording layer 11.

FIG. 4 shows the relationship between the reversal field and the frequency of the assist field in a usual magnetic recording medium without an antenna layer. The reversal field has a minimal value approximately at the resonance frequency fr of the recording layer, and the maximum assist effect is obtained at that frequency. At frequencies exceeding the resonance frequency fr, the assist effect is substantially lost.

FIG. 5 shows the relationship between the reversal field and the frequency of the assist field in a magnetic recording medium having an antenna layer whose resonance frequency fa is lower than the resonance frequency fr of the recording layer. The reversal field has minimal values both at the resonance frequency fr of the recording layer and at the resonance frequency fa of the antenna layer. The assist effect is maximum at the resonance frequency fa of the antenna layer. The assist effect in FIG. 5 is larger than that in FIG. 4 by about 30%. At the resonance frequency fa of the antenna layer, magnetization reversal occurs in such a mechanism as follows. That is, at the resonance frequency fa, the antenna layer initially resonates. In response to the resonance of the antenna layer, the recording layer also resonates, and the magnetization of the recording layer reverses. Accordingly, it is an important condition for achieving the microwave assisted magnetic recording that the resonance frequency fa of the antenna layer is lower than the resonance frequency fr of the recording layer.

FIG. 6 shows the relationship between the reversal field and the frequency of the assist field in a magnetic recording medium having an antenna layer whose resonance frequency fa is higher than the resonance frequency fr of the recording layer. As shown in FIG. 6, when the resonance frequency fa of the antenna layer is higher than the resonance frequency fr of the recording layer, improvement of the assist effect is lost, resulting in a smaller gain. Since fr<fa in this case, the resonance of the antenna layer is small when the recording layer resonates. In addition, the flying height is larger than that of a medium without an antenna layer. Thus, the assist effect is small. On the other hand, when the antenna layer resonates, the recording layer having a resonance frequency lower than that of the antenna layer does not resonate. This is also found from FIG. 4. When the recording layer does not resonate at the resonance frequency of the antenna layer in this way, the entire magnetization reversal is made difficult.

Next, examples of the materials used for the recording layer and the antenna layer of a magnetic recording medium according to the embodiments will be described. In the present invention, a hard magnetic material is used for the recording layer in order to retain recording patterns. The antenna layer, however, may be of a soft magnetic material if the resonance frequency to be described below can be adjusted. Shown here is an example where both layers are of hard magnetic materials.

A perpendicularly oriented hard magnetic film prepared by mixing approximately 10% non-magnetic oxide ($SiO_2$ or $AlO_x$) into a CoCrPt alloy may be used for the recording layer. For example, a perpendicularly oriented hard magnetic film obtained by mixing approximately 10% $SiO_2$ into $Co_{74}Cr_{10}Pt_{16}$ has Hk of approximately 14 kOe. With such a hard magnetic film, a recording density of 500 Gbpsi or more can be achieved. Also, a perpendicularly oriented hard magnetic film of $Co_{20}Pt_{80}$—$SiO_2$ has Hk of approximately 20 kOe. Such a hard magnetic film can achieve a recording density of 1 Tbpsi or more. All numbers such as 20 and 80, which are used here as subscripts of $Co_{20}Pt_{80}$ and the like represent atomic percentages.

A hard magnetic film prepared by mixing a non-magnetic oxide such as $SiO_2$ into Co and grown in hcp (hexagonal closest packing) on the recording layer may be used as the antenna layer. Such a hard magnetic film has Hk of approximately 6.8 kOe.

Sequential deposition the recording layer and antenna layer causes both the layers to be ferromagnetically coupled to each other. The magnetizations of both the layers are thus combined to facilitate their reversal. If a good antenna layer is deposited, separation of resonance peaks is shown in a resonance frequency measurement to be described later. However, proper peak separation may not be completely performed, for example, when crystal matching of the two layers is too good. In this case, a non-magnetic layer may be interposed between the recording layer and the antenna layer to control ferromagnetic coupling of both the layers. As the non-magnetic layer, a layer obtained by mixing $SiO_2$ or the like in a noble metal, such as Cu, Pt, Pu, Ru or Ag, is preferably used. A medium having a good antenna layer may also be manufactured by interposing a magnetic layer of NiFe—$SiO_2$ or the like. The thickness of a non-magnetic layer or a magnetic layer to be interposed should be adjusted in the range of 2 nm or less.

Here, assuming that the thickness of the recording layer is 10 nm, and the thickness of the antenna layer is 5 nm, the estimated value of the resonance frequency of each layer is calculated. The value of the resonance frequency is obtained by multiplying an effective field, which acts on each particle of a medium, by $\gamma$ (gyromagnetic constant). The effective field is the sum of the demagnetizing field, the anisotropic magnetic field, the covalent field and the external magnetic field.

For example, the approximate value of each magnetic field of the antenna layer is as follows:

(1) The value of the demagnetizing field is found by multiplying Ms (magnetization: 1020 emu/cc) by $4\pi$, and further multiplying by the quotient obtained by dividing a solid angle (Stradian) of a grain projected from the center by $2\pi$. When the grain is a circle with radius R (=4 nm), and half the thickness (5 nm) of the antenna layer is D, the latter value is as follows: (the solid angle)/$2\pi=[1-D/(D^2+R^2)^{1/2}]\sim0.47$. Accordingly, the demagnetizing field is $1020\times4\pi\times0.47\sim6.0$ kOe.

(2) The value of the covalent field is found by dividing the interface bond energy between the antenna layer and the recording layer by the thickness and Ms, and further multiplying by 2. The interface bonding energy is approximately 1.5 emu/cc. Accordingly, the covalent field is as follows:

$$1.5 \div 1020 \div (5e-7) \times 2 \sim 5.9 \text{ kOe}.$$

(3) Assuming the uniaxial anisotropy, the anisotropic magnetic field is approximately 6.8 kOe as described above.

The approximate value of the effective field of the antenna layer calculated by summing up the values of the fields mentioned above in consideration of their signs is 6.7 kOe. Likewise, the approximate value of the effective field of the recording layer in the foregoing case of CoCrPt—$SiO_2$ is 15.7 kOe, for example. Since the gyromagnetic constant $\gamma$ is 2.8 (MHz/Oe), the approximate value of the resonance frequency of the antenna layer is 18.8 GHz, and the approximate value of the resonance frequency of the recording layer is 44 GHz. The values satisfy the condition of fa<fr. In the case of general microwave assisted magnetic recording, the magnetic field from the magnetic pole, in addition to the foregoing effective fields, is applied to a medium, as an external magnetic field. The resonance frequency also varies in accordance with the external magnetic field. However, the magnetic field from the magnetic pole varies relatively slightly in the thickness direction of the medium. When substantially the same external magnetic field is applied to both the antenna layer and the recording layer, the relative values of the resonance frequencies of both the layers do not change, and the relationship between the resonance frequencies of both the layers being fa<fr does not change. Accordingly, estimation can be made using this method.

The precise resonance frequencies of the antenna layer and the recording layer can be measured by a ferromagnetic resonance (FMR) measurement device or the like. In a general FMR measurement, the resonance frequency is calculated by a method of applying an external magnetic field and measuring it at a single frequency to convert the external magnetic field into the frequency. However, to measure a complex resonance frequency as in the present invention, for example, the resonance frequency in a broad band may be measured by using a waveguide manufactured by microprocessing in place of a conventional waveguide. References include J. Magn. Soc. Jap., 31, 435 (2007) and App. Phys. Lett., 91, 082510 (2007).

A stacked film comprising the recording layer and the antenna layer as described above resonates at a frequency near the resonance frequency of the antenna layer, specifically at about 15 GHz, and its magnetization reversal occurs by the assist of a high-frequency magnetic field.

Regarding spin torque oscillators, the oscillation frequency often cannot be freely designed. This is because of the following reason. The resonance frequency of an oscillation layer, which is a component of an oscillator, determines the frequency of the assist high-frequency magnetic field. However, the size, the anisotropic magnetic field and the saturation magnetization of the oscillation layer, and the external magnetic field leaking from the magnetic pole toward the oscillator, and so on relevant to the resonance frequency are related to oscillation characteristics and the intensity of the high-frequency magnetic field. For the purpose of designing stable elements, it is difficult to individually vary these parameters. On the other hand, in view of thermal reliability and so on, there is little room for freely designing the resonance frequency of the recording layer. In contrast, in the present invention, the anisotropic magnetic field and the saturation magnetization of the antenna layer can be set relatively freely. Accordingly, the resonance frequency can be set relatively freely. Where the frequency with the maximum assist effect exists as shown in FIG. 5, that is, when the resonance frequency fa of the antenna layer is set to be coincident with the frequency of the oscillation layer, a very large assist effect can be achieved. As found from FIG. 5, the assist effect rapidly decreases when the frequency is equal to or more than fa, and therefore at least the resonance frequency fa of the antenna layer should be set to be equal to or more than the oscillation frequency of the oscillation layer. This adjustment of the frequencies of the medium and the oscillation layer can be freely made in the present invention. The resonance frequency of the medium as used here is not the frequency when the external magnetic field is not applied, which has been described above, but the resonance frequency when being actually used, that is, when the magnetic field from the magnetic pole is applied. In the case where the resonance frequency of the medium is to be actually determined, a magnetic field applied to the medium from the magnetic pole is calculated by means of a simulation, and FMR is measured in a state that a magnetic field equivalent to the calculated magnetic field is applied to the medium.

Figure 7A:
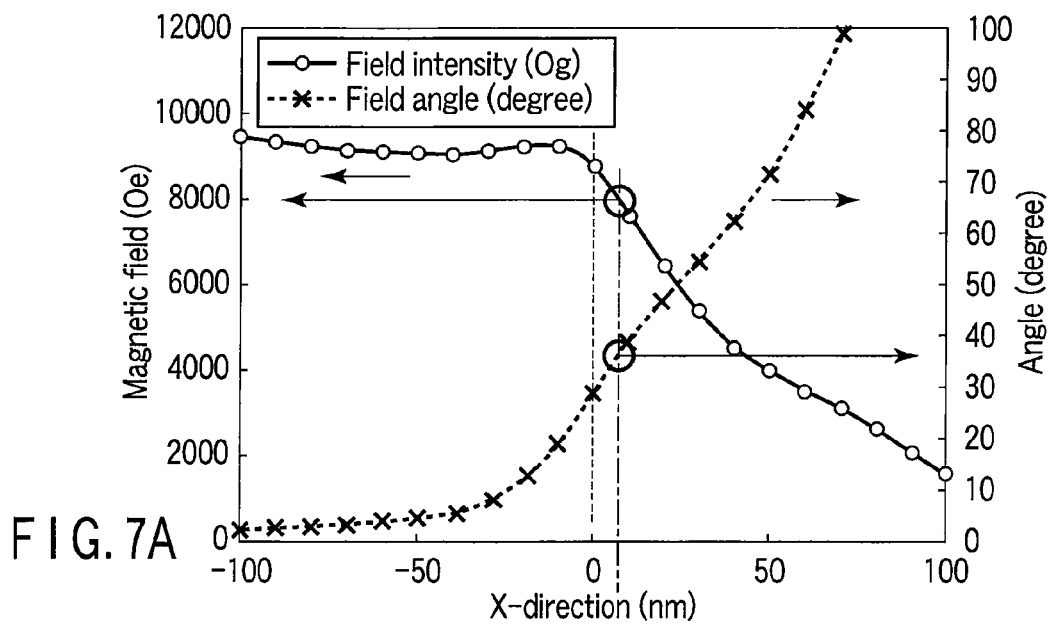
FIG. 7A is a graph showing the intensity and the angle of the magnetic field from the magnetic pole.
Figure 7B:
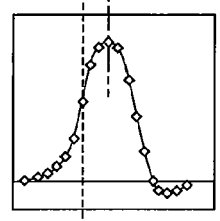
FIG. 7B is a graph showing the effective field intensity of the high-frequency magnetic field excited by the oscillator.
Figure 7C:
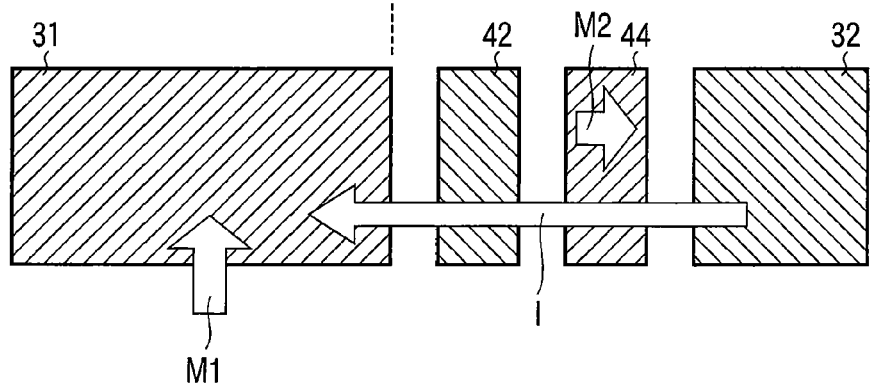
FIG. 7C is a view showing the direction of excitation of the magnetic pole, the direction of magnetization of the spin injection layer and the current direction.

FIGS. 7A to 7C show an example of a simulation of the magnetic field applied to a medium. FIG. 7A is a graph showing the intensity and the angle of the magnetic field from the magnetic pole. FIG. 7B is a graph showing the effective field intensity of the high-frequency magnetic field excited by the oscillator. FIG. 7C is a view showing the direction of excitation of the magnetic pole (M1), the direction of magnetization of the spin injection layer (M2) and the current direction (I).

In FIG. 7A, regarding the angle of the magnetic field, the direction in which the magnetic pole is excited is defined as 0 degree. The magnetic field applied to the medium is directed in the direction in which the magnetic pole is excited, i.e., perpendicular to the air-bearing surface, when the magnet field is directly under the magnetic pole (in a range of negative values on the X axis in FIG. 7A). However, as the magnetic field is away from the magnetic pole and shifts towards the direction of a trailing shield, the direction of the magnetic field changes to the horizontal direction from the magnetic pole toward the trailing shield.

Under the depicted conditions, the effective field intensity of the high-frequency magnetic field has a peak on the magnetic pole side from the center of the oscillation layer. The intensity and angle of the magnetic pole magnetic field at this peak position, indicated by chain lines in FIGS. 7A and 7B, constitute an effective magnetic pole magnetic field in assisted recording. Therefore, if the resonance frequency is measured with the magnetic field intensity, 8 kG in the example of FIG. 7A, and the angle, about 38 degrees in FIG. 7A, applied at this position, the state of the medium during actual writing can be observed.

Figure 8:
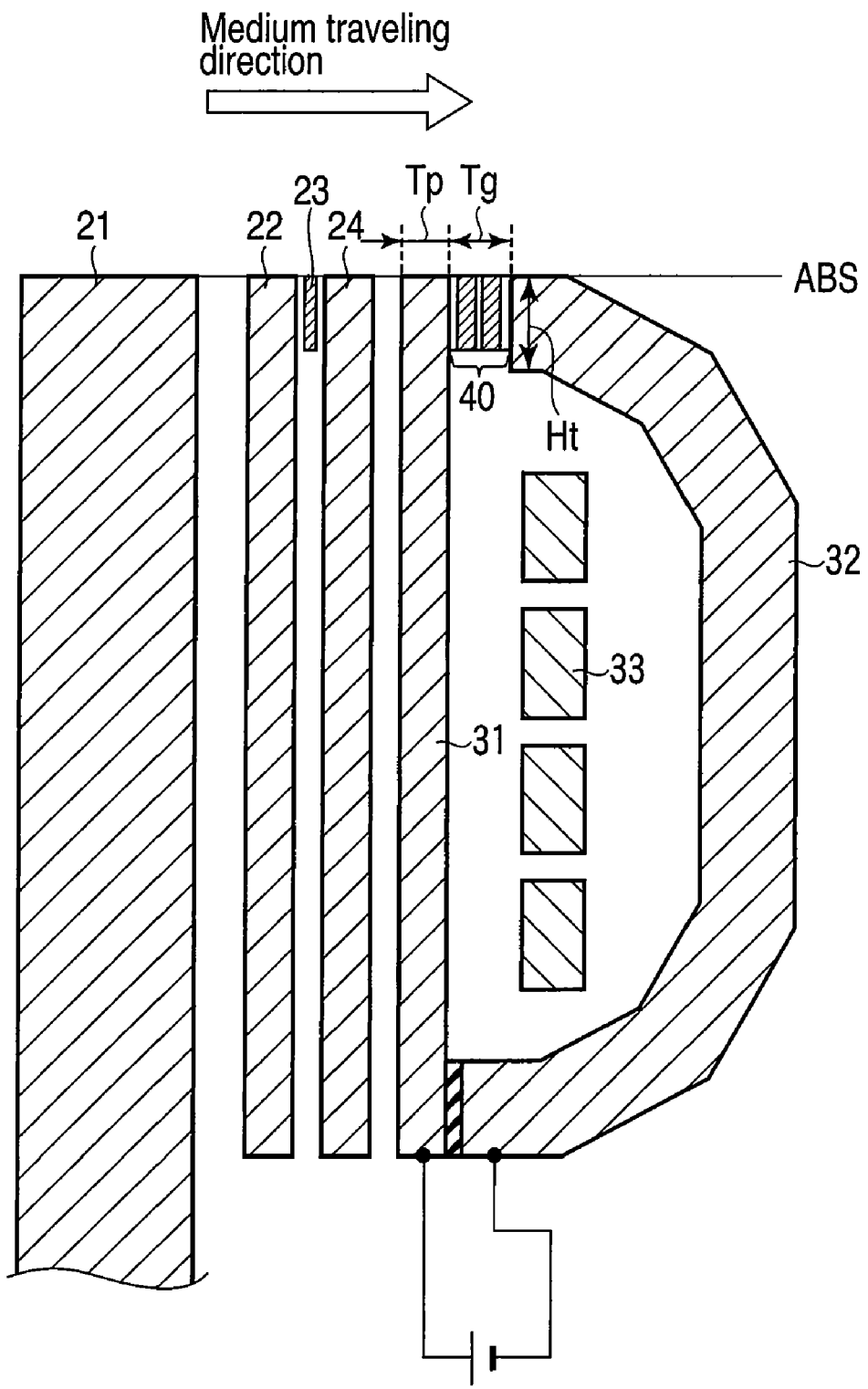
FIG. 8 is a cross-sectional view of a magnetic recording head according to the embodiment.

FIG. 8 is a cross-sectional view of the whole magnetic recording head. Formed on a substrate 21 are a shield 22, a read element 23, a shield 24, a magnetic pole 31, a spin torque oscillator (STO) 40 and a shield 32. The applied magnetic field greatly varies in accordance with the shape and the magnetic characteristics, especially sizes around the gap such as a gap width Tg, a thickness Tp of the magnetic pole, and a throat height Ht shown in FIG. 8 of the recording head. In determining the applied magnetic field, the shape and material characteristics of the actual head should be exactly studied.

The resonance frequency of the oscillation layer should be measured in a state that the oscillation layer is provided adjacent to the magnetic pole as shown in FIGS. 2 and 8, where an FMR measurement used for the medium cannot be used. This is because the oscillation layer is interposed in a gap of the recording head where a very strong magnetic field is produced, as shown FIGS. 2 and 8. In other words, in a state in which the oscillation layer is not provided, a magnetic field of 5 to 20 kOe produced in the gap is not applied to the oscillation layer, and therefore the resonance frequency decreases in accordance with that magnet field.

The reason for providing the oscillation layer in the gap is that a peak of the high-frequency magnetic field is to be positioned at a point where the magnetic field from the magnetic pole is large, as described above. In general, a peak of the magnetic field exists at a position 5 to 20 nm apart from the oscillation layer, and therefore the oscillator is used in such a strong magnetic field environment. In addition, if the excitation polarity of the magnetic pole is reversed, the magnetic field in the gap is also reversed. To enable the stable use of the oscillator even when the magnetic field in the gap is reversed, it is conceivable to use a spin-flip type oscillator, in which reversal of the spin injection layer is made at the same time as the reversal of the magnetic field in the gap.

In a spin-flip type oscillator, the coercivity of the spin injection layer is set to be smaller than the magnetic field in the gap produced from the magnetic pole. In this way, even when the polarity of the magnetic field in the gap is reversed, the magnetization of the spin injection layer is always flipped in the gap magnetic field direction. Further, if the coercivity of the oscillation layer is set to be smaller than the coercivity of the spin injection layer, a state in which the magnetization of the oscillation layer is oscillated while the magnetization of the spin injection layer is relatively stationary can be achieved.

An appropriate material is used for the spin injection layer of the spin-flip type oscillator so that reversal of the spin injection layer is made with the gap magnetic field and the spin injection layer is stable when used together with the oscillation layer. Examples of the material that can be used include materials excellent in perpendicular orientation, such as CoCrPt, CoCrTa, CoCrTaPt, CoCrTaNb, and other CoCr magnetic layers, TbFeCo and other RE-TM amorphous alloy magnetic layers, Co/Pd, Co/Pt, CoCrTa/Pd and other Co artificial lattice magnetic layers, CoPt and FePt alloy magnetic layers, and SmCo alloy magnetic layers, whose magnetizations are oriented perpendicular to the film plane; soft magnetic layers of CoFe, CoNiFe, NiFe, CoZrNb, FeN, FeSi, FeAlSi and the like, whose saturation flux densities are relatively large and which have magnetic anisotropy in the direction of the film plane; Heusler alloys selected from the group including CoFeSi, CoMnSi, CoMnAl and the like; and CoCr magnetic alloy films whose magnetizations are oriented in the in-plane direction. Further, a plurality of the above materials may be stacked.

As described above, the oscillation layer is deposited closer to the magnetic pole than the spin injection layer. In this case, the magnetic pole, the oscillation layer, the intermediate layer and the spin injection layer are deposited in this order. That is, it is advantageous that the intermediate layer can be used as a seed for the spin injection layer. Accordingly, it is conceivable to use Cu, a typical material for the intermediate layer and use for the spin injection layer a multilayer superlattice, such as (Co/Ni)n, (Co/Pt)n or (Co/Pb)n, which includes Cu and can ensure good perpendicular orientation. The notation as used here, such as (Co/Ni)n, indicates a structure in which thin films of Co and Ni each having several angstroms are stacked n times.

To measure the resonance frequency of the oscillation layer in a state of a practical unit, the following method is used. That is, when an operating current is passed through an oscillator in a state that the magnetic pole is excited, and the frequency component of noise at a current input terminal of the oscillator is observed, the resonance frequency can be measured by utilizing the fact that noise becomes large near the resonance frequency. However, since the relative angle between the magnetization of the oscillation layer and the magnetization of the spin injection layer does not vary even when the oscillation layer oscillates, in general, no noise peak occurs even with the magneto-resistive effect of the magnetization of the oscillation layer and the magnetization of the spin injection layer. To overcome this drawback, a magnetic field is applied in a direction perpendicular to the air-bearing surface (ABS) to vary the relative angle between the magnetization of the oscillation layer and the magnetization of the spin injection layer. This allows a resonance peak of noise to be observed. As described above, a system with a very high assist effect can be provided by measuring the resonance frequencies of the antenna layer and the oscillation layer and adjusting their relative values.

Second Embodiment

A magnetic recording medium according to a second embodiment will be described.

Figure 9A:
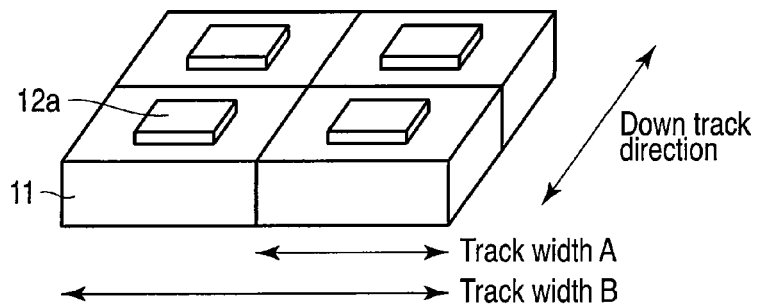
FIGS. 9A and 9B are perspective views showing magnetic recording media according to a second embodiment.

FIG. 9A is a perspective view of an example of the magnetic recording medium according to the present embodiment. In FIG. 9A, dot-shaped antenna layers 12a divided into reversal units are formed on the recording layer 11 made of a continuous film. In other words, the antenna layer is processed into bit patterns. Note that in FIG. 9A, the magnetizations of the dot of one antenna layer 12a and the recording layer 11 thereunder are reversed in the case of a track width A, and the magnetizations of the dots of two antenna layers 12a and the recording layer 11 thereunder are reversed in the case of a track width B.

The antenna layers 12a divided into reversal units facilitate the magnetization reversal of the reversal unit of the recording layer 11 because of the effect of concentrating the magnetic flux from the magnetic recording head. On the other hand, since the magnetic volume of the reversal unit formed of the antenna layer 12a and the recording layer 11 is not reduced, never leading to deterioration in thermal reliability.

The effects of reduction in read noise and suppression of writing from the adjacent track can be obtained. In a magnetic recording medium having antenna layers, a recording layer is never directly affected by an assist field from a spin torque oscillator. Therefore, side erase can be prevented if antenna layers are separated on the tracks adjacent to each other.

Figure 9B:
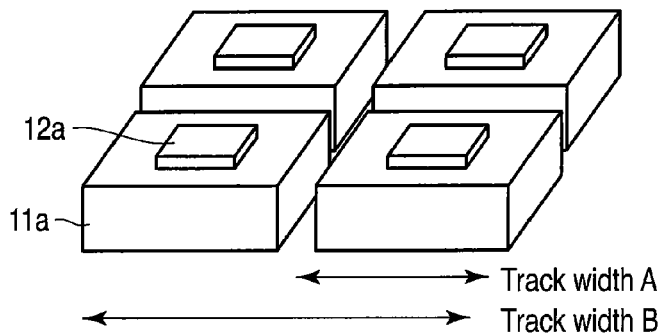

FIG. 9B is a perspective view of another example of the magnetic recording medium according to the present embodiment. In FIG. 9B, dot-shaped antenna layers 12a divided into reversal units are formed on dot-shaped recording layers 11a divided into reversal units. In other words, the recording layer and the antenna layer are processed into bit patterns. The area of the antenna layer 12a functioning as the reversal unit is smaller than the area of the recording layer 11a functioning as the reversal unit. In the magnetic recording medium of FIG. 9B, the magnetization reversal can be further facilitated in the reversal units.

Third Embodiment

A magnetic recording apparatus according to the present embodiment will be described.

Figure 10A:
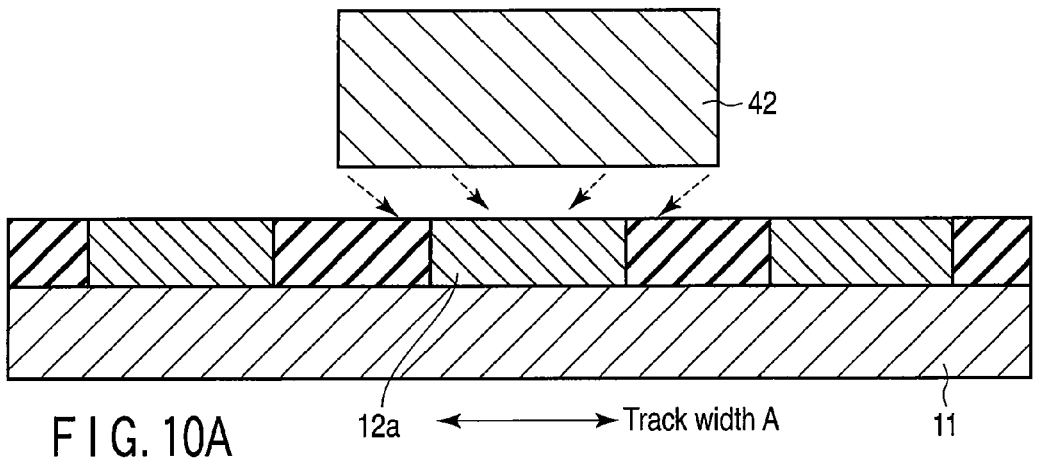
FIG. 10A is a cross-sectional view showing a magnetic recording apparatus according to a third embodiment.
Figure 10B:
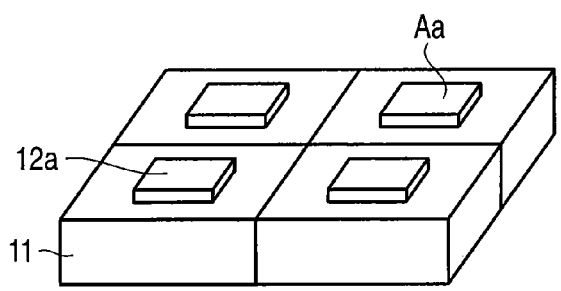
FIG. 10B is a perspective view showing a magnetic recording medium according to the third embodiment.

FIG. 10A is a cross-sectional view of the magnetic recording apparatus according to the present embodiment. In FIG. 10A, dot-shaped antenna layers 12a divided into reversal units are formed on the recording layer 11 made of a continuous film. The area Aa, shown in FIG. 10B, of a head facing surface of the antenna layer 12a functioning as a reversal unit is smaller than the area of the air-bearing surface of the oscillation layer 42 of the spin torque oscillator. In this example, the area of a surface obtained by sectioning the antenna layer 12a in parallel to the head facing surface is constant no matter where the antenna layer 12a is sectioned in the thickness direction thereof. However, depending on the conditions, such as a manufacturing method, this area may not be constant. In such a case, the cross-sectional area of the head facing surface when sectioned at the center in the thickness direction, which is indicated by chain lines in FIG. 10A, is employed as a criterion of the area of the head facing surface. Note that the recording layer may not or may be processed into bit patterns.

In such a magnetic recording apparatus, the energy density of the antenna layer 12a becomes high, allowing the assist efficiency to be more raised. Also, writing from the adjacent track can be suppressed.

Next, the configuration of a hard disk drive on which the magnetic recording medium and the magnetic recording head according to an embodiment of the present invention are installed will be described.

Figure 11:
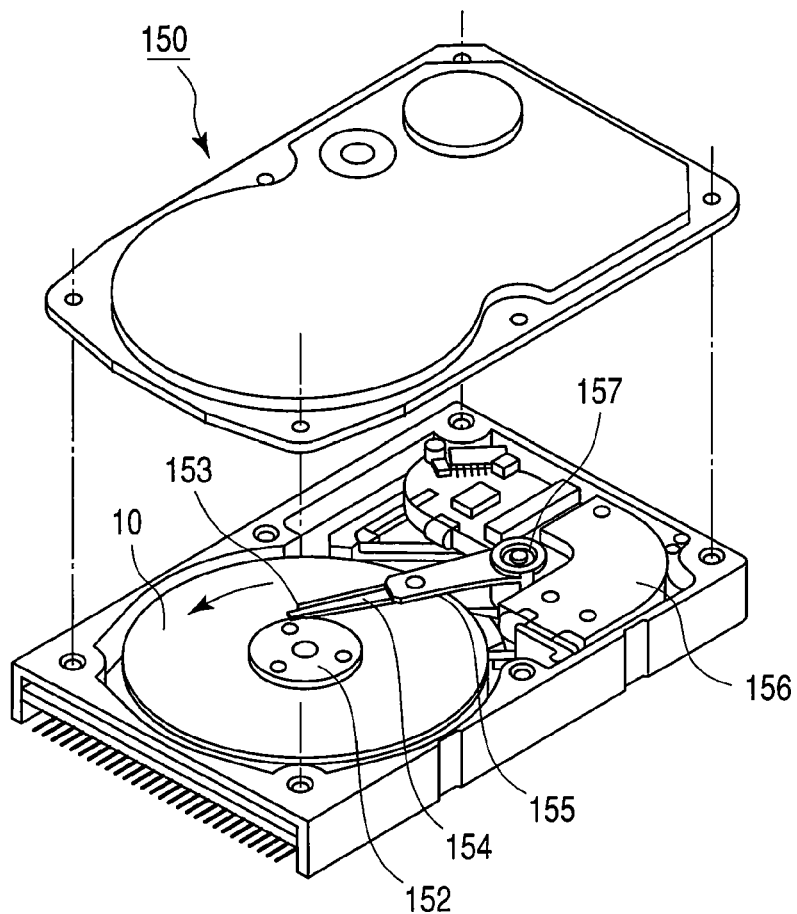
FIG. 11 is a perspective view showing the configuration of a hard disk drive according to another embodiment.

FIG. 11 is a perspective view showing the configuration of a hard disk drive according to another embodiment. The hard disk drive 150 is of a type using a rotary actuator. In this figure, a magnetic disk 10 in which an antenna layer is formed is installed on a spindle 152. The magnetic disk 10 is rotated by a motor (not shown) that responds to control signals from a drive controller (not shown). The magnetic recording apparatus 150 according to the embodiment may comprise a plurality of magnetic disks 10.

A head slider 153 is attached to the tip of a suspension 154 in a thin film for performing read and write of information stored in the magnetic disk 10. The head slider 153 has a magnetic head including the recording head according to the above embodiments mounted near the tip thereof.

When the magnetic disk 10 rotates, the air-bearing surface (ABS) of head slider 153 is held so as to fly over the surface of the magnetic disk 10 by a predetermined height. Alternatively, the head slider may be of a so-called in-contact type contacting to the magnetic disk 10.

The suspension 154 is connected to one end of an actuator arm 155. A voice coil motor 156, a type of a linear motor, is provided on the other end of the actuator arm 155. The voice coil motor 156 is formed of a magnetic circuit including a driving coil (not shown) wound around a bobbin and a permanent magnet and a counter yoke arranged opposite to each other so as to sandwich the coil therebetween.

The actuator arm 155 is held by ball bearings (not shown) provided at two vertical positions of the spindle 157. The actuator arm 155 can be rotatably slid by the voice coil motor 156.

Figure 12:
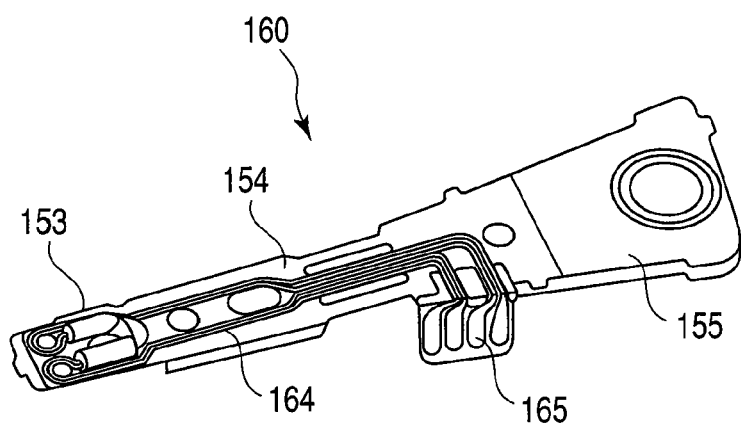
FIG. 12 is a perspective view of a head gimbal assembly of FIG. 11 as viewed from the disk side.

FIG. 12 is a perspective view of a head gimbal assembly including tip end side of the actuator arm 155, which is viewed from the disk. The assembly 160 has the actuator arm 155, and the suspension 154 is connected to one end of the actuator arm 155. The head slider 153 is attached to the tip of the suspension 154, and the head slider 153 comprises a magnetic head including the recording head according to any of the above embodiments. The suspension 154 has leads 164 used to write and read signals. The leads 164 are electrically connected to respective electrodes in the magnetic head incorporated in the head slider 153. Reference numeral 165 in the figure denotes electrode pads of the assembly 160.

The present invention comprises the magnetic head including the magnetoresistive element according to any of the above embodiments of the present invention. This makes it possible to reliably read information magnetically recorded on the magnetic disk 10 at a recording density higher than that in the prior art.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording apparatus comprising:
   a magnetic recording head having a magnetic pole and a spin torque oscillator, the spin torque oscillator being placed adjacent to the magnetic pole and comprising at least two magnetic layers of a first magnetic layer and a second magnetic layer; and
   a magnetic recording medium comprising two magnetic layers of a recording layer and an antenna layer, the recording layer including a hard magnetic material, such that the antenna layer is formed closer to the magnetic recording head than the recording layer,
   wherein the antenna layer has a resonance frequency fa lower than a resonance frequency fr of the recording layer, greater than a resonance frequency of the second magnetic layer, and the recording layer and the antenna layer are ferromagnetically coupled to each other.

2. The apparatus according to claim 1, wherein the antenna layer is divided into reversal units.

3. The apparatus according to claim 1, wherein the antenna layer and the recording layer are each divided into reversal units, and a cross section, obtained by sectioning at a center position in a thickness direction of a reversal unit of the antenna layer horizontally with respect to a head facing surface, is smaller than a cross section at a center position in a thickness direction of a reversal unit of the recording layer.

4. The apparatus according to claim 1, wherein the antenna layer is divided into reversal units, and a cross section, obtained by sectioning at a center position in a thickness direction of a reversal unit of the antenna layer horizontally with respect to a head facing surface, is smaller than an area of an air-bearing surface of the second magnetic layer of the spin torque oscillator.

5. A magnetic recording apparatus comprising:
   a magnetic recording head having a magnetic pole and a spin torque oscillator, the spin torque oscillator being placed adjacent to the magnetic pole and comprising at least two magnetic layers of a first magnetic layer and a second magnetic layer, the first magnetic layer having a coercivity smaller than a magnetic field produced from the magnetic pole and located at the first magnetic layer, the second magnetic layer having a coercivity smaller than the coercivity of the first magnetic layer; and
   a magnetic recording medium comprising two magnetic layers of a recording layer and an antenna layer, at least the recording layer being hard magnetic, such that the antenna layer is formed closer to the magnetic recording head than the recording layer, the antenna layer has a resonance frequency fa lower than a resonance frequency fr of the recording layer, and the recording layer and the antenna layer are ferromagnetically coupled to each other.

* * * * *